Dec. 31, 1968   TETSUO MAEDA   3,418,867
HANDLE CONTROL DEVICE FOR BICYCLE SPEED CHANGE GEAR
Filed Dec. 21, 1966
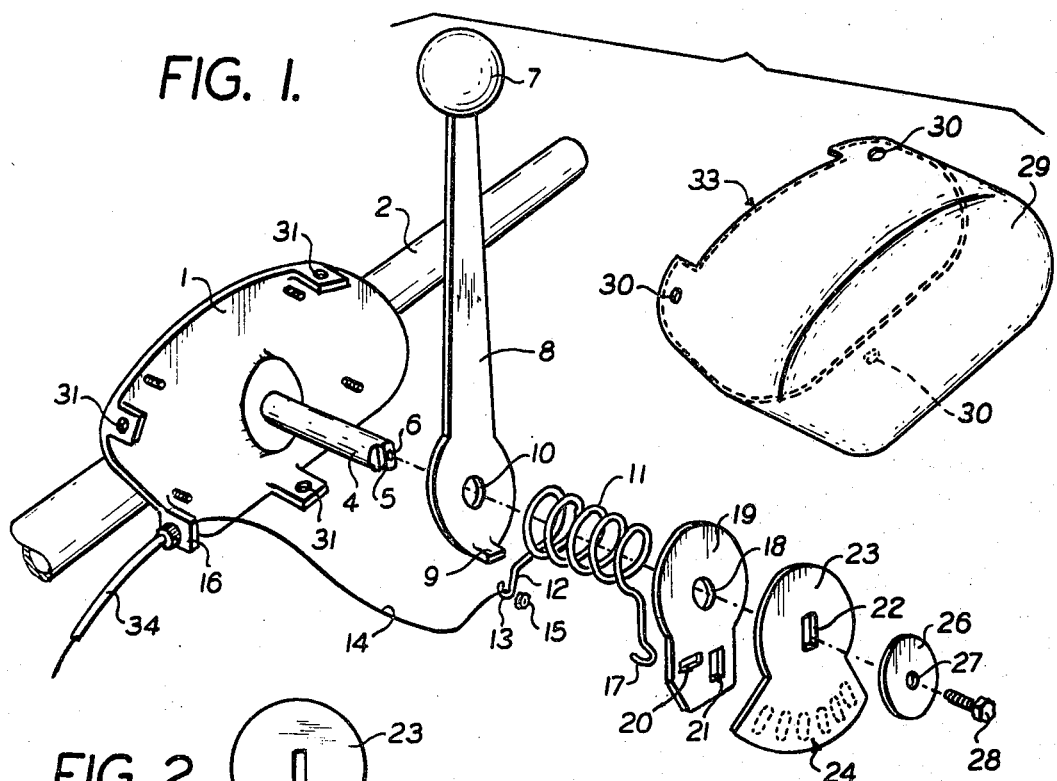
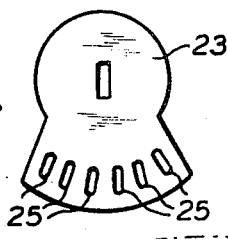
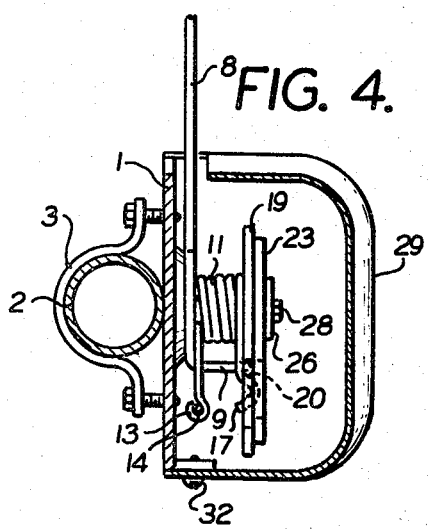
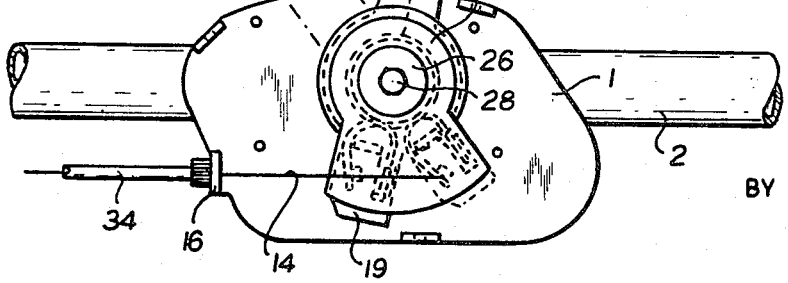
INVENTOR
TETSUO MAEDA
BY
*Ernest G Montague*
ATTORNEY.

United States Patent Office 3,418,867
Patented Dec. 31, 1968

3,418,867
HANDLE CONTROL DEVICE FOR BICYCLE
SPEED CHANGE GEAR
Tetsuo Maeda, 16 1-ban, 2-cho, Minami-Koyo-cho,
Sakai, Osaka Prefecture, Japan
Filed Dec. 21, 1966, Ser. No. 603,505
Claims priority, application Japan, Nov. 19, 1966,
41/76,257
10 Claims. (Cl. 74—535)

ABSTRACT OF THE DISCLOSURE

A handle control device for bicycles for a speed change gear comprising a shaft secured to a bicycle frame, and a control handle means including a handle grip and at least one revolving plate jointly operatively connected therewith and the latter pivotally mounted on the shaft for joint rotation with the handle grip. A coil compression spring is disposed axially about the shaft and presses against the revolving plate. The revolving plate is formed with a spring clasping recess through which one end of the coil spring protrudes, the other end of the coil spring engaging a gear change wire. A spring control plate is non-rotatably secured to the shaft adjacent the revolving plate and has a plurality of circumferentially spaced dents adjacent the spring clasping recess in which the protruding end of the coil selectively and releasably engages upon pivoting of the control handle means.

---

The present invention relates to a handle control device for a speed change gear, in general, and to a handle control device for a bicycle speed change gear operated by transferring the driving chain to multiple free wheels arranged on the rear wheel of the bicycle, in which the speed change gear and the control handle are connected by a wire, so that when the wire is pulled by operating the handle, the wire forces the driving chain to transfer from a smaller diameter wheel to a larger diameter wheel, in particular.

With conventional structures transmission of the driving chain between the multiple free wheels in the speed change gear cannot be conducted when the bicycle is not running. It must be conducted by utilizing the rotary inertia force of the multiple free wheels during the running of the bicycle.

Due to frequent failure to observe this requirement, it has frequently occurred that the controlling handle became warped, or that the wire became stretched, or that the parts of the speed change gear became bent, for example, due to careless operation of the conventionl controlling handle.

It is an object of the present invention to eliminate and solve the above-mentioned disadvantages.

It is an object of the present invention to provide a handle control device for bicycles for a speed change gear wherein a spring is directly connected between a control handle and a gear change wire for resiliently actuating in gear change.

It is another object of the present invention to provide a handle control device for bicycles for a speed change gear comprising a shaft, secured to the bicycle frame, a control handle means including a handle grip and at least one revolving plate operatively connected therewith, the latter being mounted pivotally on the shaft for joint rotation with the handle grip. A coil spring is axially positioned on the shaft pressing against the revolving plate and protruding at one end through a spring clasping recess formed thereon and engages selectively, dents formed in a spring control plate secured non-rotatably to the shaft, the other end of the spring being connected with the gear change wire.

It is still another object of the present invention to provide a handle control device for bicycles for a speed change gear in accordance with the above-mentioned objective wherein a pawl member extends from the revolving plate abutting the spring ends.

It is yet still another object of the invention to provide a handle control device for bicycles for a speed change gear in accordance with the above-mentioned objectives wherein two axially space opposed revolving plates are provided, adapted for joint rotation between which the spring is compressed.

With these and other objects in view which will become apparent in the following detailed description, the present invention will be clearly understood in connection with the accompanying drawing, in which:

FIG. 1 is an exploded perspective view of a controlling handle designed according to the present invention:

FIG. 2 is a rear view of the spring controlling plate;

FIG. 3 is a side elevation of the assembled parts of the handle, and

FIG. 4 is a longitudinal cross sectional view of the handle.

Referring now to the drawings, and more particularly, to FIG. 1, a handle in accordance with the present invention includes a base plate 1, and a U-shaped ring 3 (FIG. 4) is fixed to the back side of the plate 1 held about a suitable portion of frame 2 of the bicycle. A shaft 4 projects laterally from about the central part of the base plate 1 and the tip of the shaft 4 is cut square so as to form a square shaft tip 5. A threaded hole 6 is formed axially in the end face square shaft tip 5.

A control handle 8 is provided with a ball handle grip 7, and includes at its lowermost edge a pawl member 9 having a suitable length and projecting laterally therefrom. A hole 10 is provided slightly above the pawl member 9, into which hole 10 is inserted the innermost part of the shaft 4, permitting the control handle 8 to be installed so as to freely swing about the shaft 4 as its fulcrum.

A torsion coil spring 11 is provided having a rear end 12 bent into a small ring 13. The ring 13 holds a union link 15 of the tip of a wire 14, which wire extends through a small hole in the center of a flange 16 projecting from the front brim of the base plate 1 and which is connected to the speed change gear of the bicycle. The front end 17 of the torsion coil spring 11 is bent sidewards substantially in a V-shape. As shown in FIG. 4, the spring 11 is inserted axially about the shaft 4 in a compressed condition. The rear end 12 of the spring 11 is fixed to the front brim of the pawl member 9 of the handle, and the front end of the spring 11 is arranged behind the pawl member 9.

A central hole 18 is provided in a revolving plate 19 in which is inserted the front end of the rounded part of the shaft 4. In the lower portion of the revolving plate 19 are a horizontal oblong pawl clasping hole 20 and a spring clasping hole 21, the latter extending vertically. As seen in FIG. 4, the tip of the pawl 9 is inserted into the pawl clasping hole 20, while the V-shaped member 17 of the torsion coil spring 11 is inserted into the recess or spring clasping hole 21.

A spring control plate 23 is provided with a square hole 22 in its center, complementary to the square shaft tip 5 of the shaft 4 which is inserted therein.

Referring now again to the drawing and more particularly to FIG. 2, several dents 25 are formed radially in the back of the lower scalloped member portion 24 of the spring control plate 23. A metal washer 26 is applied to the forwardmost end of the shaft 4. A bolt 28 is placed into a small hole 27 in the center of the washer 26 and screwed into the threaded hole 6 of the shaft 4, securing operatively all the members on the shaft 4. A bag-shaped cover 29, preferably made of metal or plastics, or the like, is attached to the base plates by screws 32 inserted through a plurality of holes 30 on the brim of the open end of the cover and into aligned screw holes 31 on the circumferential brim of the base plate 1 fastening the cover 29 to the base plate 1. The upper brim portion of the open end of the cover 29 forms long and narrow slits 33 through which the control handle 8 extends freely for operation thereof. A covering 34 is provided about the wire 14, the tip of which is applied to outside of the flange 16 of the base plate 1.

The bent end 12 of the rear side of the torsion coil spring 11 is formed to abut over and downwardly the front brim of the pawl member 9 of the controlling handle 8, while the end part 17 formed into the V-shape on the front side of the torsion coil spring 11 is formed likewise to catch the near brim of the pawl member 9 of the controlling handle 9.

The central square hole 28 of the spring control plate 23 is adapted to engage the square shaft tip 5 so as to be firmly fixed to the shaft 4. Since the pawl member 9 of the control handle engages in the pawl clasping hole 20 of the spring revolving plate 19, the latter will move jointly with the control handle 8 which pivots around the shaft 4. Inasmuch as the torsion coil spring 11 fits on the shaft 4 in its compressed condition, its V-shaped member 17 at the front end projects out beyond the spring clasping hole 21, as shown in FIG. 4, and engages releasably one of the dents 25 of the spring control plate 23. Because of this latter arrangement, the control handle 8 and the spring revolving plate 19 will likewise be controlled in their natural rotation. But, both the control handle 8 and the spring revolving plate 19 can be revolved forcefully. That is, the torsion coil spring 11 is adapted to be very springy, and accordingly the V-shaped member 17 will slide over the spring control plate 23, when it is forcefully revolved, while falling into some of dents 25 in the back of the portion 24 of the controlling plate 23. Consequently when the controlling handle 8 is pivoted in the inclined direction indicated by the arrow in FIG. 3, the torsion coil spring 11 will be forced to tighten, and the wire 14 is pulled strongly and the driving chain will be forced by the speed change gear to switch and rise up from the small diameter wheel to the larger diameter one. In reverse, when the controlling handle 8 is pivoted in the inclined direction opposite to the arrow, the torsion coil spring 11 will loosen and the driving chain will be forced by the speed change gear to switch in the opposite direction.

For example, if the multiple free wheel for the speed change of the bicycle is composed of six wheels, every time the V-shaped protruding member 17 is clasped by each of the six dents 25, respectively, the driving chain will be switched to each of the six wheels, respectively, so that each of the switched conditions of the chain can be easily recognized by means of the sensing transmitted to the operator's hand clasping the controlling handle 8, due to the spring protruding member 17 snapping resiliently and releasably into each dent 25.

According to the present invention, the control handle 8 and the wire 14 are connected through the torsion coil spring 11 so that, to the contrary of conventional speed change gear systems (the latter wherein the wire is directly connected with the control handle), there is no danger with the present invention, of forced overstrain on any of the parts of the control handle device. Naturally, the possibility of damage, such as a resultant straightened wire or a disfigured handle or of damage to the other parts of the speed change gear are greatly reduced. In addition, inasmuch as the torsion coil spring 11 is located on the shaft 4 in its compressed condition and tightened by the washer 26, the compression of the spring 11 will press the washer 26 against the head of the bolt 28, precluding loosening thereof and minimizing dissembling of the parts of the system during operation. Furthermore, by utilizing the spring force of the torsion coil spring 11, the V-shaped member 17 is adapted to engage succesfully the dents 25 of the spring controlling plate 23, which plate 23 is fixed to the tip 5 of the shaft 4, so that the entire structure of the present invention is thereby simplified such that the switched conditions of the handle are readily ascertained at any time.

The control handle 8 and the spring revolving plate 19 are defined herein as a control handle means, the latter including the two opposed axially spaced revolving plates, namely the lower circular part of the controlling handle 8, with its pawl member 9 (constituting an integral lever arm with the handle grip) and the spring revolving plate 19, both pivotally mounted for joint rotation about the shaft 4.

I claim:

1. A handle control device for bicycles for a speed change gear comprising
    a shaft,
    means for securing said shaft to a bicycle frame,
    a control handle means including a handle grip and at least one revolving plate jointly operatively connected therewith, the latter pivotally mounted on said shaft for joint rotation with said handle grip,
    a coil compression spring disposed axially about said shaft pressingly against said at least one revolving plate,
    one of said at least one revolving plate formed with a spring clasping recess,
    one end of said coil spring including a formation pressingly held, protruding through and beyond said spring clasping recess,
    the other end of said coil spring adapted to engage a gear change wire, and
    a spring control plate non-rotatably secured to said shaft adjacent said one of said at least one revolving plate and having a plurality of circumferentially spaced dents in which said protruding one end of said coil spring selectively and releasably engages, respectively, upon pivoting of said control handle means.

2. The handle control device, as set forth in claim 1, wherein
    said at least one revolving plate comprises two axially spaced opposed revolving plates pivotally mounted on said shaft for joint rotation, and
    said coil spring being compressed between said two opposed revolving plates.

3. The handle control device, as set forth in claim 2, wherein
    one of said two opposed revolving plates forms an integral lever arm with said handle grip, and
    the other of said two opposed revolving plates having said spring clamping recess.

4. The handle control device, as set forth in claim 2, wherein
    said means for securing said shaft to a bicycle frame comprising a base plate adapted to be secured to said bicycle frame,
    said shaft connected to said base plate, and
    one of said two opposed revolving plates disposed on said shaft contiguous to said base plate, and
    the other of said two opposed revolving plates having said spring clamping recess.

5. The handle control device, as set forth in claim 4, wherein
    said one of said two revolving plates forms an integral lever with said handle grip.

6. The handle control device, as set forth in claim 4, wherein said ends of said spring coil extend downwardly abutting said pawl member, and means abutting said spring control plate, securing the latter axially against the compression force of said spring.

7. The handle control device, as set forth in claim 2, wherein said two opposed revolving plates constitute separate members, one of said separate members including a pawl member integral therewith, and said other of said separate members having a pawl clasping hole receiving said pawl member therein.

8. The handle control device, as set forth in claim 7, wherein said ends of said spring coil extend downwardly abutting said pawl member.

9. The handle control device, as set forth in claim 1, wherein said spring control plate has an opening with at least one flat edge disposed around a portion of said shaft having at least one cooperating flat surface at a free end, and an abutting means against said spring control plate and said free end of said shaft non-rotatably securing said spring control plate and said shaft to each other, said abutting means comprises a washer and a screw bolt, said free end of said shaft having a threaded screw bore, and said screw bolt passing through said washer, said opening and into said screw bore respectively.

10. The handle control device, as set forth in claim 1, further comprising a cover having a single open end removably secured to said base plate enclosing said device and forming a slit through which said handle grip extends.

References Cited

UNITED STATES PATENTS

| 2,667,081 | 1/1954 | Asp et al. | 74—473 |
| 2,770,980 | 11/1956 | Millward | 74—535 XR |
| 2,924,115 | 2/1960 | Hood | 74—501 XR |

FOREIGN PATENTS

| 374,603 | 5/1931 | Great Britain. |

FRED C. MATTERN, Jr., *Primary Examiner.*

JAMES A. WONG, *Assistant Examiner.*

U.S. Cl. X.R.

74—470, 473, 501